United States Patent
Wyman

(10) Patent No.: US 7,528,887 B2
(45) Date of Patent: May 5, 2009

(54) SYSTEM AND METHOD FOR PERFORMING INVERSE TELECINE DEINTERLACING OF VIDEO BY BYPASSING DATA PRESENT IN VERTICAL BLANKING INTERVALS

(75) Inventor: Richard H. Wyman, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 492 days.

(21) Appl. No.: 11/026,369

(22) Filed: Dec. 30, 2004

(65) Prior Publication Data

US 2006/0077299 A1    Apr. 13, 2006

Related U.S. Application Data

(60) Provisional application No. 60/617,457, filed on Oct. 8, 2004.

(51) Int. Cl.
H04N 7/01 (2006.01)
H04N 11/20 (2006.01)

(52) U.S. Cl. ...................... 348/452; 348/448
(58) Field of Classification Search ................ 348/700, 348/701, 448, 452, 474, 558, 97; 382/170, 382/190, 195, 224–226
See application file for complete search history.

(56) References Cited

U.S. PATENT DOCUMENTS

| | | | | |
|---|---|---|---|---|
| 4,641,188 A | * | 2/1987 | Dischert | 348/448 |
| 4,982,280 A | * | 1/1991 | Lyon et al. | 348/448 |
| 5,191,427 A | * | 3/1993 | Richards et al. | 348/97 |
| 5,365,273 A | * | 11/1994 | Correa et al. | 348/452 |
| 5,689,301 A | * | 11/1997 | Christopher et al. | 348/97 |
| 5,929,902 A | * | 7/1999 | Kwok | 348/96 |
| 6,055,018 A | * | 4/2000 | Swan | 348/448 |
| 6,317,165 B1 | * | 11/2001 | Balram et al. | 348/699 |
| 6,459,454 B1 | * | 10/2002 | Walters | 348/448 |
| 6,724,433 B1 | * | 4/2004 | Lippman | 348/558 |
| 6,842,194 B1 | * | 1/2005 | Sugihara | 348/441 |
| 7,113,221 B2 | * | 9/2006 | Law et al. | 348/448 |
| 7,129,990 B2 | * | 10/2006 | Wredenhagen et al. | 348/449 |
| 7,154,556 B1 | * | 12/2006 | Wang et al. | 348/452 |
| 2002/0150162 A1 | * | 10/2002 | Liu et al. | 375/240.17 |
| 2003/0156301 A1 | * | 8/2003 | Kempf et al. | 358/486 |

* cited by examiner

Primary Examiner—Victor R Kostak
(74) Attorney, Agent, or Firm—McAndrews, Held & Malloy, Ltd.

(57) ABSTRACT

A system and method that determine a portion of video data with relevant information about that video to be used in statistical calculations associated with the video. The method may comprise determining the starting line and ending line of the portion of video data with the relevant information. The remaining portion of the video data may comprise information that may contain no statistical information. The remaining portion may be a vertical blanking interval.

8 Claims, 4 Drawing Sheets

SYSTEM AND METHOD FOR PERFORMING INVERSE TELECINE DEINTERLACING OF VIDEO BY BYPASSING DATA PRESENT IN VERTICAL BLANKING INTERVALS

RELATED APPLICATIONS

This patent application makes reference to, claims priority to and claims benefit from U.S. Provisional Patent Application Ser. No. 60/617,457, entitled "System and Method for Performing Inverse Telecine Deinterlacing of Video by Bypassing Data Present in Vertical Blanking Intervals" filed on Oct. 8, 2004, the complete subject matter of which is hereby incorporated herein by reference, in its entirety.

This application makes reference to:
U.S. Provisional Patent Application Ser. No. 60/540,717, filed on Jan. 30, 2004;
U.S. application Ser. No. 10/945,769 filed Sep. 21, 2004;
U.S. application Ser. No. 10/875,422 filed Jun. 24, 2004;
U.S. application Ser. No. 10/945,619 filed Sep. 21, 2004;
U.S. application Ser. No. 10/945,587 filed Sep. 21, 2004;
U.S. application Ser. No. 10/871,758 filed Jun. 17, 2004;
U.S. application Ser. No. 10/945,817 filed Sep. 21, 2004;
U.S. application Ser. No. 10/945,729 filed Sep. 21, 2004;
U.S. application Ser. No. 10/945,828 filed Sep. 21, 2004;
U.S. application Ser. No. 10/946,152 filed Sep. 21, 2004;
U.S. application Ser. No. 10/871,649 filed Jun. 17, 2004;
U.S. application Ser. No. 10/946,153 filed Sep. 21, 2004;
U.S. application Ser. No. 10/945,645 filed Sep. 21, 2004;
U.S. Provisional Patent Application Ser. No. 60/616,071 filed Oct. 5, 2004;
U.S. Provisional Patent Application Ser. No. 60/616071 filed Oct. 5, 2004;
U.S. Provisional Patent Application Ser. No. 60/616,071, filed Oct. 5, 2004;
U.S. patent application Ser. No. 11/051415 filed Feb. 4, 2005;
U.S. patent application Ser. No. 11/027365 filed Dec. 30, 2004; and
U.S. patent application Ser. No. 11/027140 filed Dec. 30, 2004.

The above stated applications are hereby incorporated herein by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In video system applications, a picture is displayed on a television or a computer screen by scanning an electrical signal horizontally across the screen one line at a time using a scanning circuit. The amplitude of the signal at any one point on the line represents the brightness level at that point on the screen. When a horizontal line scan is completed, the scanning circuit is notified to retrace to the left edge of the screen and start scanning the next line provided by the electrical signal. Starting at the top of the screen, all the lines to be displayed are scanned by the scanning circuit in this manner. A frame contains all the elements of a picture. The frame contains the information of the lines that make up the image or picture and the associated synchronization signals that allow the scanning circuit to trace the lines from left to right and from top to bottom.

There may be two different types of picture or image scanning in a video system. For some television signals, the scanning may be interlaced video format, while for some computer signals the scanning may be progressive or non-interlaced video format. Interlaced video occurs when each frame is divided into two separate sub-pictures or fields. These fields may have originated at the same time or at subsequent time instances. The interlaced picture may be produced by first scanning the horizontal lines for the first field and then retracing to the top of the screen and then scanning the horizontal lines for the second field. The progressive, or non-interlaced, video format may be produced by scanning all of the horizontal lines of a frame in one pass from top to bottom.

In video compression, communication, decompression, and display, there has been for many years problems associated with supporting both interlaced content and interlaced displays along with progressive content and progressive displays. Many advanced video systems support either one format or the other format. As a result, deinterlacers, devices or systems that convert interlaced video format into progressive video format, have become an important component in many video systems.

However, deinterlacing takes fields from interlaced video and coverts them into frames of progressive video, at double the display rate. Certain problems may arise concerning the motion of objects from image to image during deinterlacing. Objects that are in motion are encoded differently in interlaced fields and progressive frames. Video images or pictures, encoded in interlaced video format, containing little motion from one image to another may be de-interlaced into progressive video format with virtually no problems or visual artifacts. However, visual artifacts become more pronounced with video images containing a lot of motion and change from one image to another, when converted from interlaced to progressive video format. As a result, some video systems were designed with motion adaptive deinterlacers.

Areas in a video image that are static are best represented with one approximation. Areas in a video image that are in motion are best represented with a different approximation. A motion adaptive deinterlacer attempts to detect motion so as to choose the correct approximation in a spatially localized area. An incorrect decision of motion in a video image results in annoying visual artifacts in the progressive output thereby providing an unpleasant viewing experience. Several designs have attempted to find a solution for this problem, but storage and processing constraints limit the amount of spatial and temporal video information that may be used for motion detection.

Frame rate defines how many pictures or frames of video information are displayed per second and the general units are frames per second (fps). In general, movies are shot at a frame rate of 24 fps. However, the standard promulgated in the United States by the National Television System Committee (NTSC) requires that information be displayed at a frame rate of 29.97 fps. Accordingly, the frame rate of movies shot at 24 fps must be changed in order to for them to be correctly displayed on NTSC compliant televisions. This process of changing the frame rate of movies from 24 fps to 29.97 fps is called telecine. Inverse telecine (IVTC) is the process utilized to transform movies from NTSC's frame rate of 29.97 fps back to a frame rate of 24 fps.

In displaying video on a screen, horizontal lines are displayed from top to bottom. A signal traces the display of the horizontal like from top to bottom of the screen. In old displaying devices, the tracing signal would take time to return to the top of the screen, to begin scanning again. The time it takes the tracing signal to get from the bottom of the screen to the top is called vertical blanking. These days, during the vertical blanking intervals, information may be inserted about the video such as, for example, whether text is added to the video (closed captioning and teletext), modes of display (widescreen mode, etc.), and other similar display-related information.

So in systems that use deinterlacers, the system detects pixels coming through the deinterlacer, and generates statistics on them to perform 3:2 pulldown or 2:2 pulldown. Problem may arise during blanking intervals, because when they go through the system, and they have nothing to do with the video itself, the information that is not relevant to the video information and pixels, may cause problems for the system that is looking for a 3:2 or 2:2 pattern.

If used, the data present within a vertical blanking interval of video can significantly affect the accuracy of one or more statistical measures used by a video processing system, such as an inverse telecine deinterlacing system that performs reverse 3:2 or 2:2 pull-down of video. The statistical measures may be utilized by a video system to handle discrepancies. Some statistical measures that are negatively affected when data resident in vertical blanking intervals is utilized, are frame-based statistical measures. A frame-based statistical measure may utilize all pixels in the frame, including those pixels resident within vertical blanking intervals.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be seen in a system and method that process video data. The method may comprise determining a first portion of the video data containing information needed to determine video-related data, and generating the video-related data utilizing only the first portion of the video data. Determining the first portion may comprise determining a starting line of video data of the first portion, and determining an ending line of video data of the first portion. The video-related data may comprise statistics related to the video data.

In an embodiment of the present invention, the starting line of video data may comprise the first line of complete video data. Similarly, the ending line of video data may comprise the last line of complete video data.

The video data may comprise the first portion of the video data and a second portion of the video data. In an embodiment of the present invention, the second portion of the video data may comprise a vertical blanking interval.

The system comprises at least one processor capable of performing the method as described hereinabove that processes video data.

These and other features and advantages of the present invention may be appreciated from a review of the following detailed description of the present invention, along with the accompanying figures in which like reference numerals refer to like parts throughout.

DETAILED DESCRIPTION OF THE INVENTION

Aspects of the present invention relate to processing video signals. More specifically, certain embodiments of the invention relate to a method and system for processing video by bypassing or ignoring data that is present within vertical blanking intervals (VBIs).

Figure 1:
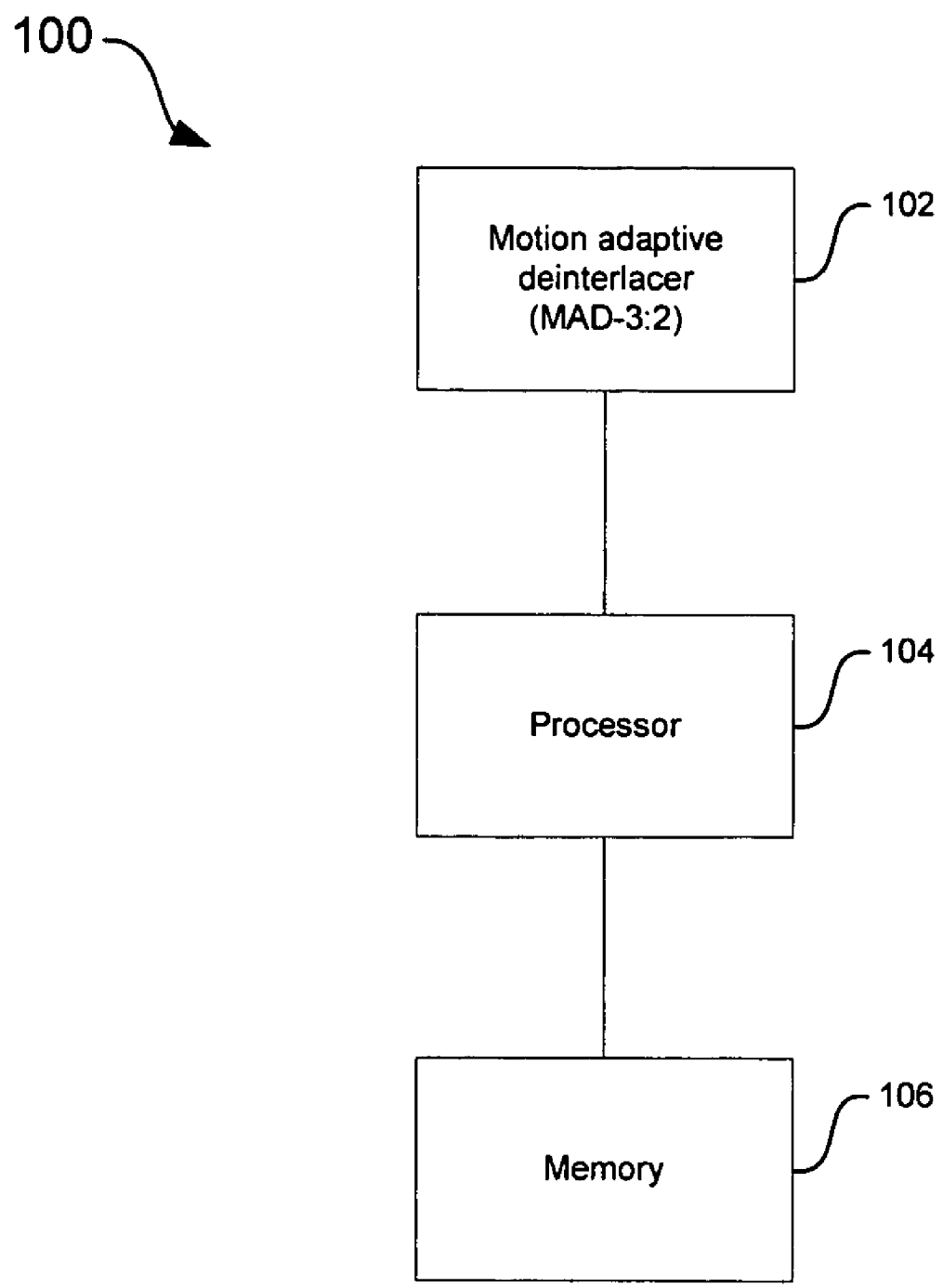
FIG. 1 illustrates a block diagram of an exemplary architecture for positioning of a motion adaptive deinterlacer, in accordance with an embodiment of the present invention.

FIG. 1 illustrates a block diagram of an exemplary architecture for positioning of a motion adaptive deinterlacer, in accordance with an embodiment of the present invention. Referring to FIG. 1, the deinterlacer system 100 may comprise a motion adaptive deinterlacer (MAD-3:2) 102, a processor 104, and a memory 106. The MAD-3:2 102 may comprise suitable logic, code, and/or circuitry that may be adapted to deinterlace video fields. The processor 104 may comprise suitable logic, code, and/or circuitry that may be adapted to control the operation of the MAD-3:2 102 and to transfer control information and/or data to and from the memory 106. The memory 106 may comprise suitable logic, code, and/or circuitry that may be adapted to store control information, data, information regarding current video fields, and/or information regarding prior video fields.

The MAD-3:2 102 may be capable of reverse 3:2 pull-down and 3:2 pull-down cadence detection which may be utilized in a video network (VN). The MAD-3:2 102 may be adapted to acquire interlaced video fields from one of a plurality of video sources in the video network and convert the acquired interlaced video fields into progressive frames, at double the display rate, in a visually pleasing manner.

The MAD-3:2 102 may be adapted to accept interlaced video input and to output deinterlaced or progressive video to a video bus utilized by the video network. The MAD-3:2 102 may accept up to, for example, 720×480i and produce, for example, 720×480p in the case of NTSC. For PAL, the motion adaptive deinterlacer (MAD) may accept, for example, 720×576i and produce, for example, 720×576p. Horizontal resolution may be allowed to change on a field-by-field basis up to, for example, a width of 720. The MAD-3:2 102 may be adapted to smoothly blend various approximations for the missing pixels to prevent visible contours produced by changing decisions. A plurality of fields of video may be utilized to determine motion. For example, in an embodiment of the present invention, five fields of video may be utilized to determine motion. The MAD-3:2 102 may produce stable non-jittery video with reduced risk of visual artifacts due to motion being misinterpreted while also providing improved still frame performance. The MAD-3:2 102 may also provide additional fields per field type of quantized motion information which may be selectable in order to reduce the risk of misinterpretation. For example, up to three (3) additional fields or more, per field type, of quantized motion information may optionally be selected in order to reduce risk of misinterpreted motion even further. This may provide a total historical motion window of up to, for example, 10 fields in a cost effective manner. Integrated cross-chrominance removal functionality may be provided, which may aid in mitigating or eliminating NTSC comb artifacts. A directional compass filtering may also be provided that reduces or eliminates jaggies in moving diagonal edges. The MAD-3:2 102 may provide reverse 3:2 pull-down for improved quality from film based sources. The MAD-3:2 102 may also be adapted to support a variety of sources.

In operation, the MAD-3:2 102 may receive interlaced fields and may convert those interlaced fields into progressive frames, at double the display rate. A portion of the information regarding fields that occurred prior to the current field being deinterlaced may be stored locally in the MAD-3:2. A portion of the information regarding fields that occurred after the current field being deinterlaced may also be stored locally in the MAD-3:2. A remaining portion of the information regarding fields that occurred prior to and after the current field may be stored in the memory 106.

The processor 104 may control the operation of the MAD-3:2 102, for example, it may select from a plurality of deinterlacing algorithms that may be provided by the MAD-3:2 102. The processor 104 may modify the MAD-3:2 102 according to the source of video fields. Moreover, the processor 104 may transfer to the MAD-3:2 102, information stored in the memory 106. The processor 104 may also transfer to the memory 106 any field-related information not locally stored in the MAD-3:2 102. The MAD-3:2 102 may then use information from the current field, information from previously occurring fields, and information from fields that occurred after the current field, to determine a motion-adapted value of the output pixel under consideration.

In an embodiment of the present invention, bypassing the data within a vertical blanking interval may prevent a subsystem such as, for example, a system that may be used to perform statistical computations, from utilizing the VBI data. The statistical measures herein described may be utilized to handle discrepancies in a video signal. For example, the statistical measures may be used to detect that the cadence or format of a received video may have suddenly changed. The change in cadence may be attributed to a "bad-edit" of the video, for example. The inverse telecine deinterlacing system may comprise a 3:2 and/or 2:2 phase lock detector (PLD). The inverse telecine deinterlacing system may accept interlaced video as an input and may output deinterlaced/progressive video. U.S. patent application Ser. No. 10/945,729 filed Sep. 21, 2004, describes a MAD-3:2 that may comprise an inverse telecine deinterlacing system, which may also perform reverse 3:2 pull-down. Such a system may be significantly affected when data present within a vertical blanking interval is not bypassed or ignored while determining statistical measures for a particular video image. As such, U.S. patent application Ser. No. 10/945,729 filed Sep. 21, 2004, is hereby incorporated herein by reference in its entirety.

Figure 2:
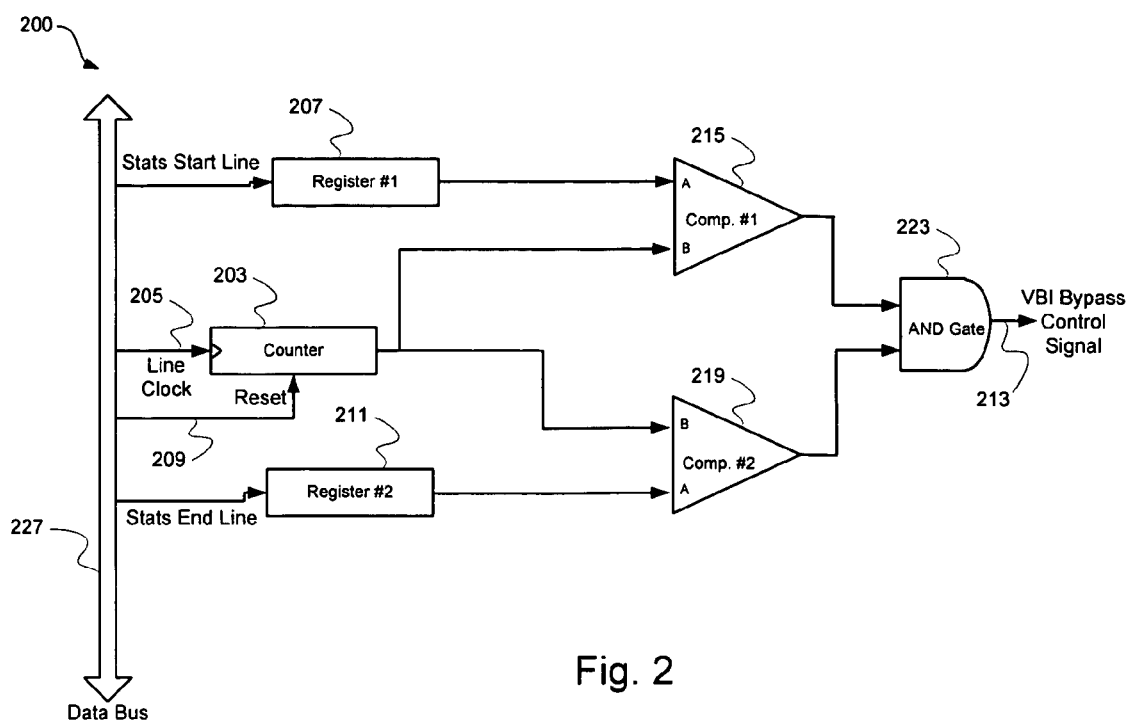
FIG. 2 illustrates a block diagram of an exemplary vertical blanking interval (VBI) bypass system, in accordance with an embodiment of the present invention.

FIG. 2 illustrates a block diagram of an exemplary vertical blanking interval (VBI) bypass system 200, in accordance with an embodiment of the present invention. The VBI bypass system 200 may be used to bypass or ignore vertical blanking intervals within a video signal during processing by a video processing system. The video processing system may comprise an inverse telecine deinterlacing system that performs reverse 3:2 or 2:2 pull-down, for example. In an embodiment of the present invention, the VBI bypass system may accept data external to a VBI to be processed by a statistical computation block of the video processing system. The statistical computation block does not consider the VBI data. The statistical computation block may comprise hardware, software, or a combination thereof.

The VBI bypass system may comprise a counter 203, a first register 207, a second register 211, a first comparator 215, a second comparator 219, and an AND gate 223. A data bus 227 may be used as an interface to receive one or more values or signals used by the VBI bypass system. The video processing system may also comprise the data bus 227. The counter 203 may be used to count the number of lines per frame or per field of the video. The counter 203 may utilize a clock signal referred to as a line clock 205. The line clock 205 may be used to count each horizontal line or horizontal scan line of the video received by the video processing system. The counter 203 may also utilize a counter reset control signal 209, which may reset the counter to 0 at the end of each frame or field. The data bus 227 may supply the line clock 205 and the counter reset control signal 209.

The first register 207 may store a value that determines the stats start line of each of the one or more frames/fields of the video signal to be processed. The stats start line may comprise the first line of each of the one or more frames that is utilized by the statistical computation block. The first line may correspond to the first line of the active video or viewable image. The value stored into the first register 207 may be obtained by way of the data bus 227. Similarly, the second register 211 may store a value that determines the stats end line of each of the one or more frames/fields of the video signal to be processed. The stats end line may comprise the last line of each of the one or more frames/fields that is utilized by the statistical computation block. The last line may correspond to the last line of the active video or viewable image. The value stored into the second register 211 may be obtained by way of the data bus 227.

In an embodiment of the present invention, the stats start and end lines may be set to restrict a region of the viewable image. For example, statistics may be measured in a region that may be part of a picture in picture type scenario; another example may be removing the bottom portion of the screen where subtitles may be overlaid, which may have an adverse effect on statistics generation if not removed.

In another embodiment of the present invention, the stats start and end lines may correspond to a left and right columns, respectively, to further restrict (and provide greater control of) the window that is utilized for measuring statistics of the image.

The first comparator 215 may receive two inputs comprising the value stored in the first register 207 and the output of the counter 203. The second comparator 219 may receive two inputs comprising the value stored in the second register 211 and the output of the counter 203. The first comparator 215 may be configured to output a logical high signal when the line count provided by the counter 203 reaches the value stored in the first register 207. As described hereinabove, the value stored in the first register 207 may determine the first line of each of the one or more fields/frames utilized by the statistical computation block. The second comparator 219 may be configured to output a logical high signal when the line count provided by the counter 203 is less than or equal to the value stored in the second register 211. As described hereinabove, the value stored in the second register 211 may determine the last line of each of the one or more fields/frames utilized by the statistical computation block. When the line count is greater than or equal to the stats start line but less than or equal to the stats end line, the AND gate 223 may output a logical high signal. The AND gate 223 output may be termed a VBI bypass control signal 213. The VBI bypass control signal 213 may be used to enable or control one or more statistical computations utilized within the statistical computation block, for example.

In an embodiment of the present invention, the VBI bypass control signal 213 may be used to enable any statistical computation system, subsystem, circuitry, hardware and/or software, etc., that performs a statistical measurement. The VBI bypass system 200 may be implemented using hardware, software, or a combination thereof. Therefore, the various aspects of the present invention are not limited to the representative embodiment described in FIG. 1.

In an embodiment of the present invention, some lines of the frame/field may be partially video data and partially VBI. Such lines may be skipped when determining the statistical information associated with the frame/field. The first line in a frame/field that is completely video data may be used as the stat start line and the last line in a frame/field that is completely video data may be used as the stat end line.

Figure 3:
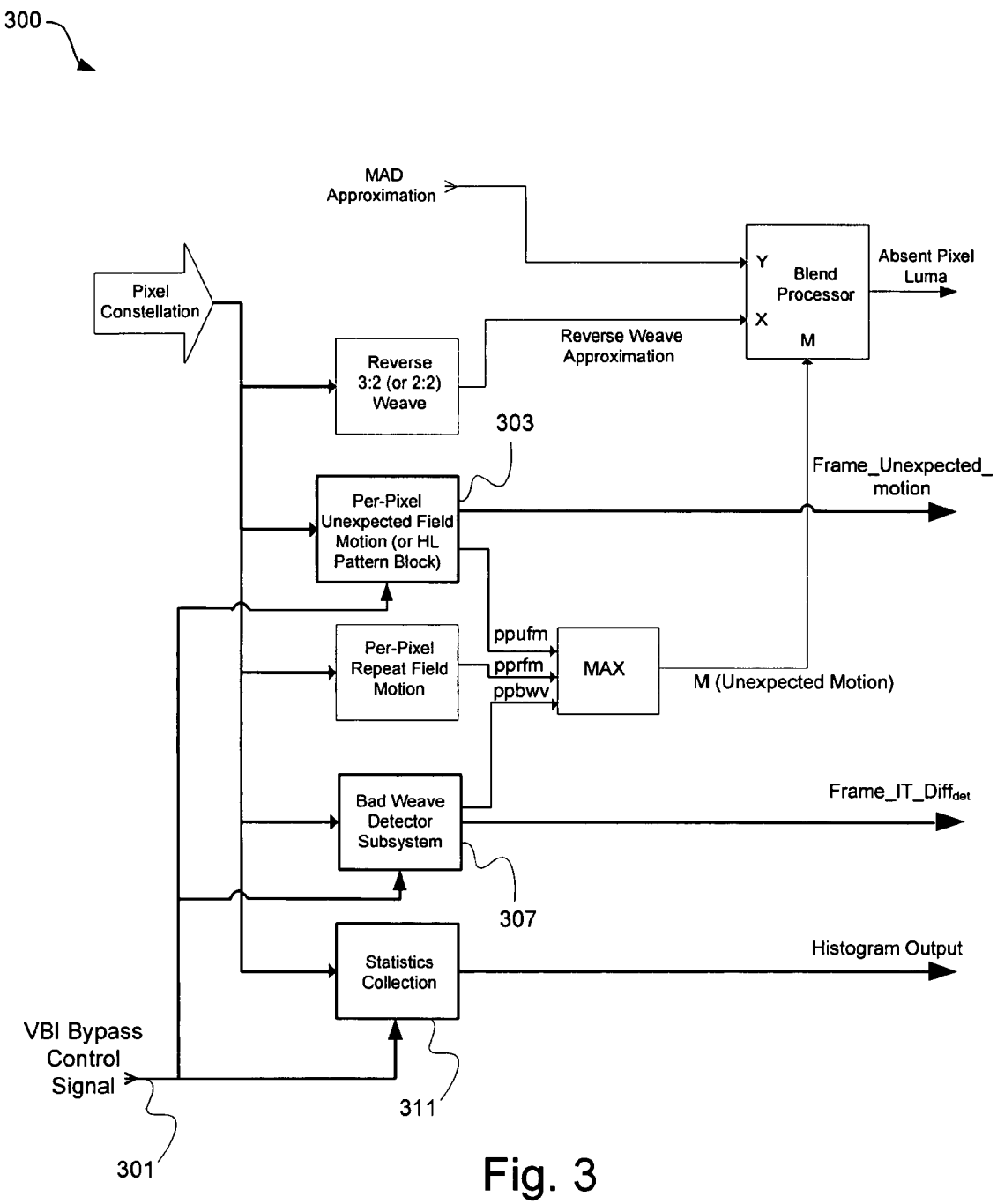
FIG. 3 illustrates a block diagram of one or more statistical computation blocks that utilize the VBI bypass system, in accordance with an embodiment of the present invention.

FIG. 3 illustrates a block diagram of one or more statistical computation blocks 300 that utilize the VBI bypass system, in accordance with an embodiment of the present invention. U.S. Provisional Application Ser. No. 60/616,071 filed Oct. 5, 2004, discloses details concerning the statistical computation blocks shown. As such, U.S. Provisional Application Ser. No. 60/616,071 filed Oct. 5, 2004, hereby incorporated herein by reference in its entirety.

The per-pixel unexpected field motion block (or HL Pattern Block) 303, bad weave detector subsystem block 307, and statistics collection block 311 may utilize a VBI bypass control signal 301 such as, for example, the VBI bypass control signal 213 of FIG. 2. The per-pixel unexpected field motion block (or HL Pattern Block) 303 may generate Frame_unexpected_motion values associated with a frame or field, which approximates the total motion associated with pixels missing from the frame. The bad weave detector subsystem block 307 may generate $Frame\_IT\_diff_{det}$ values, which provides a measure of the frame inverse telecine difference. The statistics collection block 311 may generate histogram bins for calculation of sigma values associated with the frames and used in approximating the repeat fields of a 3:2 pull-down video signal distribution.

The VBI bypass control signal 301 may be used to enable one or more statistical computations provided by each of the three statistical computational blocks 303, 307, and 311 when the video comprises active video or viewable image video. For example, if the VBI bypass control signal 301 is at a logical high level, the three statistical computation blocks 303, 307, and 311 may be enabled to facilitate one or more statistical computations provided by these blocks. On the other hand, when the VBI bypass control signal 301 is at a logical low level, it may be used to disable the statistical computations provided by each of these statistical computation blocks 303, 307, and 311 when the video comprises any data located within the vertical blanking interval.

Figure 4:
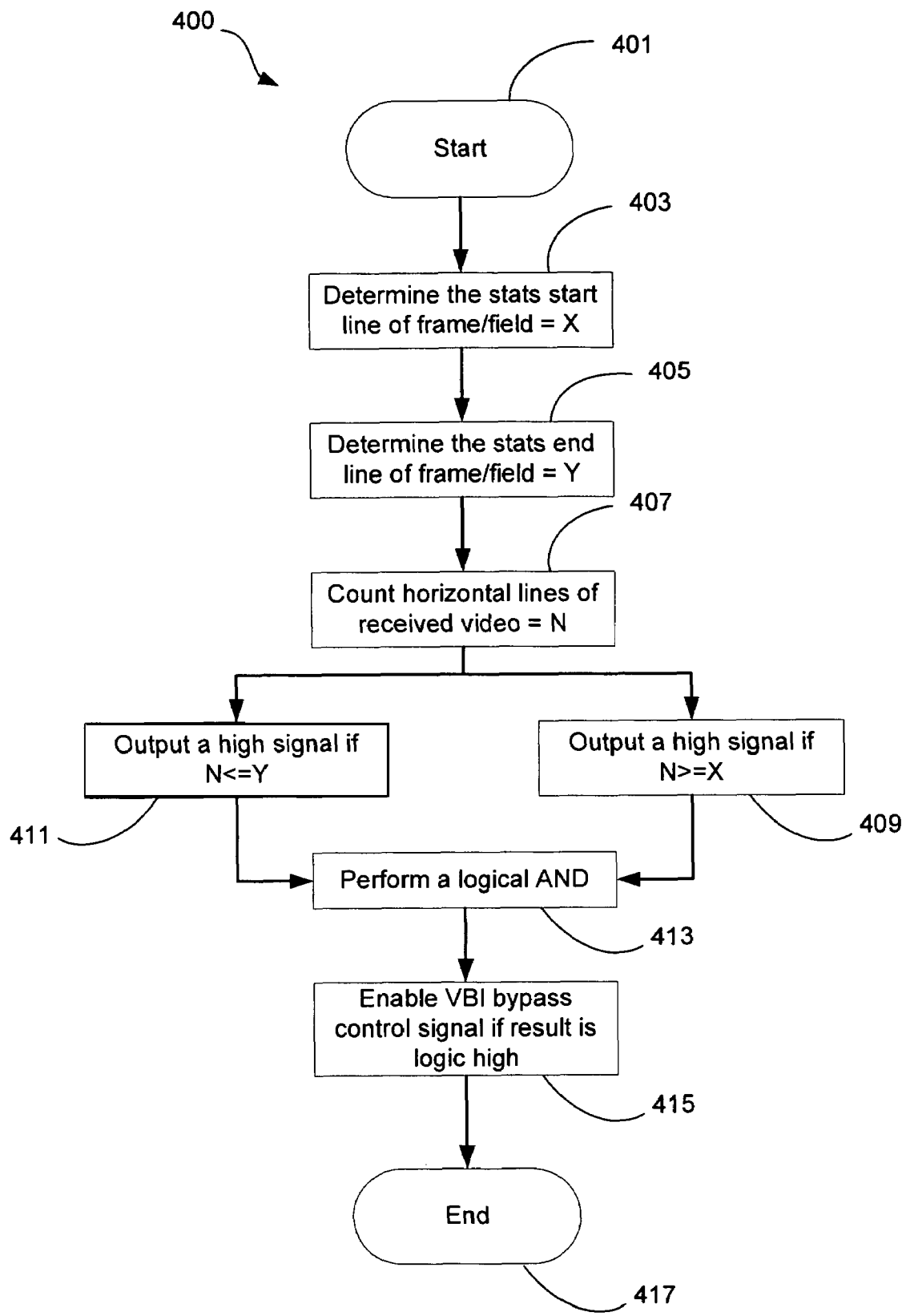
FIG. 4 illustrates a flow diagram of an exemplary method for bypassing or ignoring data that is present within vertical blanking intervals (VBIs), in accordance with an embodiment of the present invention.

FIG. 4 illustrates a flow diagram of an exemplary method 400 for bypassing or ignoring data that is present within vertical blanking intervals (VBIs), in accordance with an embodiment of the present invention. The method may begin at a start block 401, where video information may be received. At a next block 403 the stat start line of a frame/field may be determined, and the state end line of the frame/field may be determined at a next block 405. At a next block 407 each horizontal line or horizontal scan line of the video received may be counted. The number of horizontal lines may then be compared to the stat start line, and if it is greater or the same a logical high signal may be output at a block 409. Similarly, the number of horizontal lines may be compared to the stat end line, and if it is less or the same a logical high signal may be output at a block 411. The outputs of blocks 409 and 411 may then be logically ANDed at a next block 413. At a next block 415 if the result of the AND operation is a logic high, the VBI bypass control signal may be enabled, which may indicate that stats associated with the frame/field may be computed. As a result, whenever the process is within a VBI, the stat computations may be disabled to avoid erroneous computations. The method may then terminate at an end block 417.

The method 400 may be performed by hardware, software, or a combination thereof. In an embodiment of the present invention, a deinterlacer system such as, for example, the deinterlacer system 100 of FIG. 1 may perform the method 400 of FIG. 4.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for processing video data, said system comprising:
    a detection circuit for receiving a video frame and detecting a predetermined region of the video frame and detecting a remaining portion of the video frame; and
    a statistics generator for receiving the video frame and selectively gathering statistics while receiving the video frame, wherein the statistics generator gathers statistics when the detection circuit detects the portion of the video frame; and wherein the detection circuit is operable to transmit at least one signal to the statistics generator, said signal causing at least a portion of the statistics generator to be enabled or disabled.

2. The system of claim 1, wherein the remaining portion of the video frame comprises a vertical blanking interval of the video frame.

3. The system of claim 1, wherein the predetermined region of the video frame comprises pixels that are between two predetermined lines of the video frame.

4. The system of claim 3, wherein the two predetermined lines are selectable.

5. The system of claim 3, wherein the predetermined region of the video frame comprises pixels that are between two predetermined columns of the video frame.

6. The system of claim 5, wherein the predetermined columns of the video frame are selectable.

7. The system of claim 3, wherein the detection circuit further comprises:
   a bus for receiving the video frame;
   a first register for storing an indicator indicating the first predetermined line; and
   a second register for storing an indicator indicating the second predetermined line.

8. The system of claim 1, wherein the statistics generator further comprises:
   a circuit for gathering statistics for deinterlacing by weaving; and
   a circuit for gathering statistics for unexpected field motion; and
   wherein the portion of the statistics generator comprises one of the circuit for gather statistics for deinterlacing by weaving and the circuit for gathering statistics for unexpected field motion.

* * * * *